United States Patent [19]

Lawther

[11] Patent Number: 4,777,502
[45] Date of Patent: Oct. 11, 1988

[54] MIRROR SYSTEM FOR A SINGLE LENS REFLEX CAMERA

[75] Inventor: Joel S. Lawther, Rochester, N.Y.

[73] Assignee: Eastman Kodak Company, Rochester, N.Y.

[21] Appl. No.: 128,849

[22] Filed: Dec. 4, 1987

[51] Int. Cl.⁴ ............................................. G03B 19/12
[52] U.S. Cl. .................................... 354/155; 354/152
[58] Field of Search ............... 354/152, 153, 154, 155, 354/156

[56] References Cited

U.S. PATENT DOCUMENTS

| | | | |
|---|---|---|---|
| 589,349 | 8/1897 | Holst | 354/156 |
| 713,629 | 11/1902 | Garfield | 354/152 |
| 2,057,198 | 10/1936 | Marcussen | 354/153 |
| 2,980,001 | 4/1961 | Sauer et al. | 354/155 |
| 3,020,815 | 2/1962 | Landbrecht | 354/154 |
| 3,532,044 | 10/1970 | Shimomura | 354/156 |
| 3,540,365 | 11/1970 | Ishizaka et al. | 354/154 |
| 3,675,557 | 7/1972 | Yokozato et al. | 354/153 |
| 4,114,172 | 9/1978 | Yao | 354/153 |
| 4,190,339 | 2/1980 | Arai | 354/156 |
| 4,204,758 | 5/1980 | Haynes | 354/152 |
| 4,319,825 | 3/1982 | Newton | 354/293 |
| 4,673,271 | 6/1987 | Alfredsson | 354/152 |

Primary Examiner—A. A. Mathews
Attorney, Agent, or Firm—Roger A. Fields

[57] ABSTRACT

In a single lens reflex camera, a mirror can be positioned at an angle between the rear of the taking lens and the film to reflect the light rays that come through the lens, on to a spaced prism and eyelens of the viewfinder, and it can be positioned out of the way to expose the film. The mirror is supported to swing in an arc about a single axis from its light-reflecting position to a non-reflecting position vertically arranged between the prism and the eyelens. This kind of movement of the mirror advantageously permits the back focus of the taking lens required to clear the mirror for its movement to be reduced.

3 Claims, 3 Drawing Sheets

MIRROR SYSTEM FOR A SINGLE LENS REFLEX CAMERA

CROSS-REFERENCE TO RELATED APPLICATIONS

Reference is made to commonly assigned, copending U.S. application Ser. No. 128,844, filed Dec. 4, 1987 in the names of William L. Burnham, Joel S. Lawther, and Richard F. Manley and entitled MIRROR SYSTEM FOR A SINGLE LENS REFLEX CAMERA, and commonly assigned, copending U.S. application Ser. No. 128,837, filed Dec. 4, 1987 in the name of Joel S. Lawther and entitled MIRROR SYSTEM FOR A SINGLE LENS REFLEX CAMERA.

BACKGROUND OF THE INVENTION

1. Field of the Invention

The invention relates generally to the field of photography, and specifically to a mirror system for a single lens reflex camera. More particularly, the invention relates to a mirror system which is improved to reduce the clearance required for movement of its swingable mirror.

2. Description of the Prior Art

Typically in a single lens reflex camera, a flip-up mirror is located between the objective lens and the film. The mirror is normally disposed at an angle of 45°, centered on the optical axis of the objective lens, but it can flip up about a pivot pin at the top of the mirror to lie flat. When the mirror is disposed at the 45° angle, it reflects the rays of light that come through the objective lens, on to a ground glass screen in a viewfinder of the camera. A field lens and a penta-roof prism in the viewfinder direct the light rays through an eyelens at the rear of the camera to enable the subject to be photographed to be viewed through the objective lens. The prism has several reflecting surfaces which turn the image formed by the objective lens on the ground glass screen upright as well as right-wayround. When the mirror is flipped up to lie flat, it covers the underside of the ground glass screen and the light rays from the objective lens fall on the film. The positioning of the mirror is such that when an image of the subject to be photographed is focused on the ground glass screen, with the mirror at the 45° angle, the same image falls into focus on the film when the mirror is flipped out of the way.

In many reflex cameras, the mirror is moved out of the way by a spring which is released immediately before the shutter is actuated to take a picture in response to finger pressure against a shutter release button on the outside of the camera body. The mirror there has to be retensioned before every exposure (and in fact before an image can be observed again on the ground glass screen). On most reflexes this retensioning is coupled with the film transport and/or shutter tensioning. Alternatively, an instant return mirror may be employed. The mirror there flips back immediately after the exposure.

Movement of the flip-up mirror between its 45° position and its flipped-up position requires a fair amount of space. Consequently, the objective lens must have a sufficient back focus to provide ample clearance for the mirror movement. Various systems have been tried to reduce the clearance required. One of the earliest consists of supporting the mirror along its horizontal center axis, and swinging it back and up rather than hinging it at the top. More modern designs involve systems where the mirror drops down into the bottom of the camera housing, or folds up along its middle. Another variation, used in 18×24 mm miniature reflexes, is a sideways mirror movement. Since the 18×24 mm image is upright in the camera, this movement along the long side of the negative takes up less space.

THE CROSS-REFERENCED APPLICATIONS

The application cross-referenced above each disclose a mirror system which is improved to reduce the clearance required for movement of its swingable mirror.

The first cross-referenced application discloses a single lens reflex camera in which a mirror can be positioned at an angle between the rear of the taking lens and the film to reflect the light rays that come through the lens, on to a focusing screen of the viewfinder, and can be positioned out of the way to expose the film. The mirror is supported to swing forward toward the rear of the lens and downward to at least partially below the film, simultaneously, from its light-reflecting position to a non-reflecting inverted position substantially facing the bottom of the camera. This advantageously permits the back focus of the lens required to clear the mirror for movement from its light-reflecting position to out of the way to expose the film, to be reduced.

The second cross-referenced application similarly discloses a single lens reflex camera in which a mirror can be positioned at an angle between the rear of the taking lens and the film to reflect the light rays that come through the lens, on to a focusing screen of the viewfinder, and can be positioned out of the way to expose the film. However, in this application, the mirror is supported to swing in an arc about a single axis, without inverting the mirror, from its light-reflecting position to a non-reflecting position at least partially beneath the taking lens. This kind of movement of the mirror advantageously permits the back focus of the lens required to clear the mirror for its movement to be reduced.

SUMMARY OF THE INVENTION

According to the invention, there is provided an improved single lens reflex camera generally of the type wherein a mirror can be positioned at an angle between a taking lens and the film to reflect the rays of light that come through said lens, on to a spaced prism and eyelens of a viewfinder, and can be positioned out of the way to expose the film, and wherein the improvement comprises:

means for supporting said mirror to swing from its light-reflecting position at said angle between the taking lens and the film to a non-reflecting position substantially between said prism and said eyelens, whereby the back focus of the taking lens required to clear the mirror for movement from its light-reflecting position to out of the way to expose the film can be reduced (as compared to prior art devices).

DETAILED DESCRIPTION OF THE PREFERRED EMBODIMENT

The invention is disclosed as being embodied preferably in a single lens reflex 35 mm camera. Because such a camera is well known, this description is directed in particular to photographic elements forming part of or cooperating directly with the disclosed embodiment. It is to be understood, however, that other elements not specifically shown or described may take various forms known to persons of ordinary skill in the art.

Figure 1:
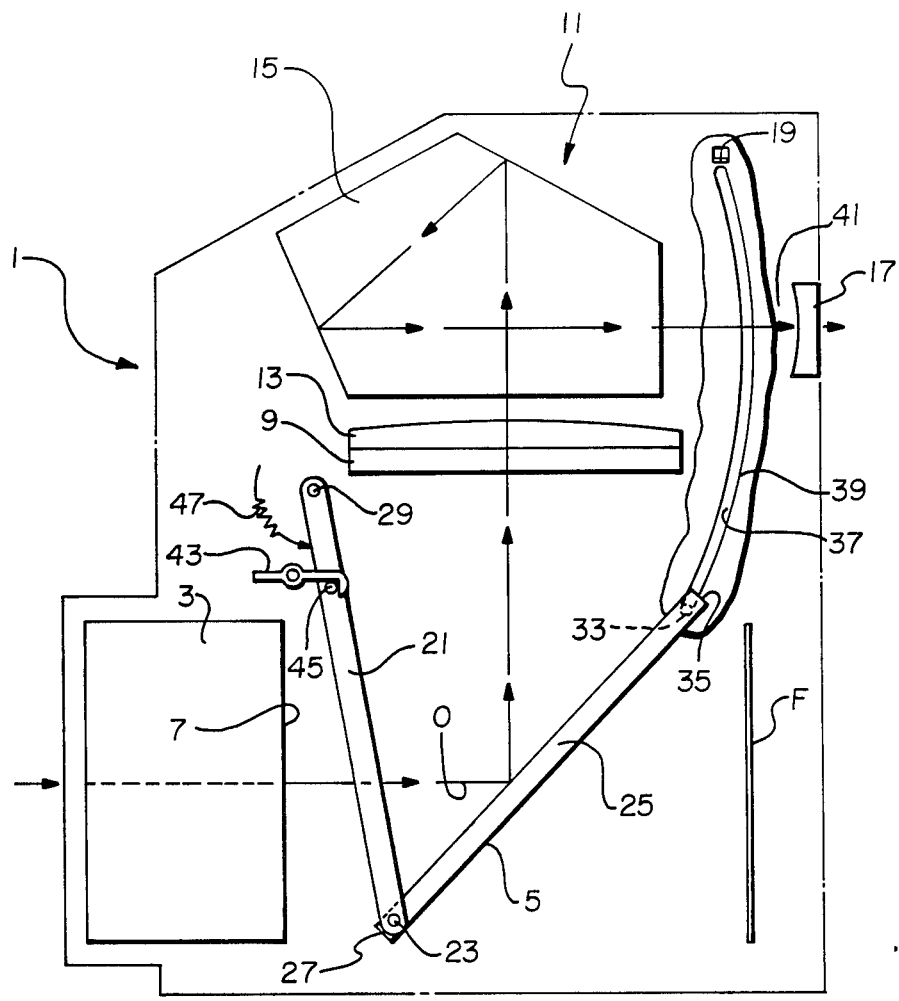
FIG. 1 is a side elevation view of the conventional optics in a single lens reflex camera, and an improved mirror system for use with the optics in accordance with a preferred embodiment of the invention.
Figure 2:
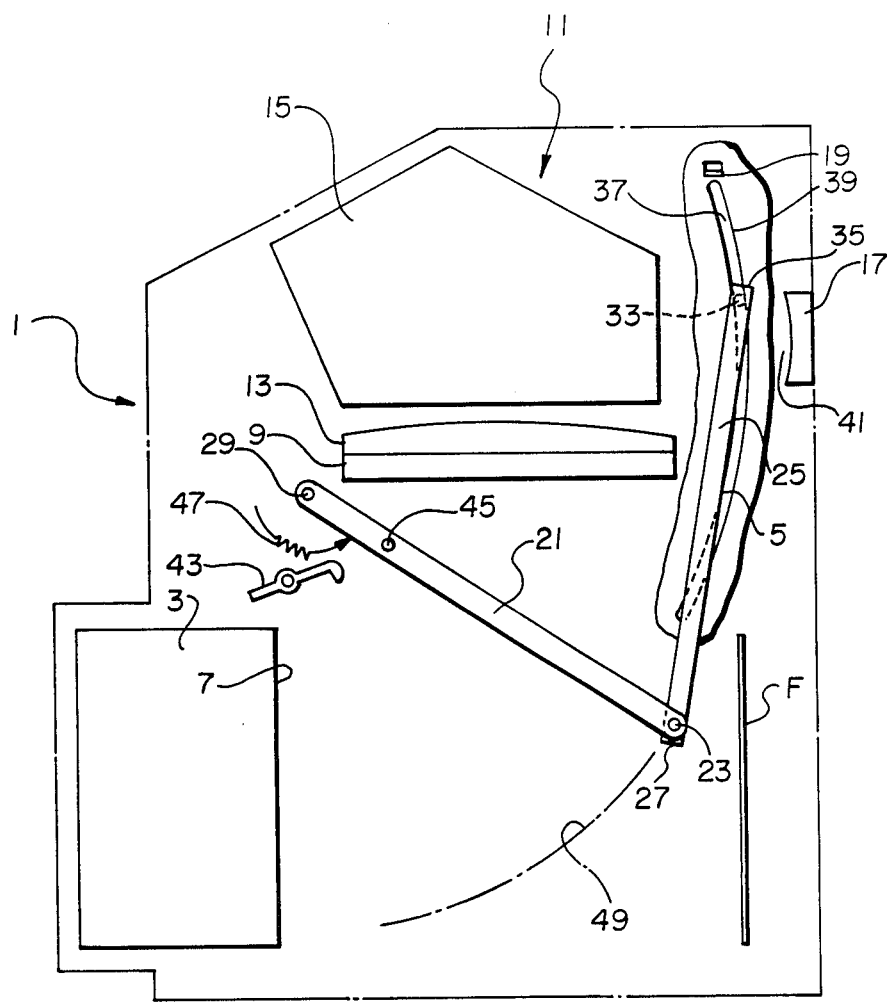
FIGS. 2 and 3 are views similar to FIG. 1, depicting successive stages of operation of the improved mirror system.

Referring now to the drawings, FIG. 1 shows certain elements of a single lens reflex 35 mm camera 1. The camera 1 includes an objective or taking lens 3 for focusing an image of the subject being photographed on a film frame F. Conventional means, such as a pressure plate and a pair of parallel rails, not shown, support the film frame F in the focal plane of the taking lens 3. A mirror 5 is normally located between the rear 7 of the taking lens 3 and the film frame F. The mirror 5 is disposed at an angle of approximately 45°, centered on the optical axis 0 of the taking lens 3, but it can be swung rearward and upward to a vertical position out of the way of the lens, as sequentially shown in FIGS. 2 and 3. When the mirror 5 is positioned at the 45° angle, it reflects the rays of light that come through the taking lens 3, on to a ground glass screen 9 in a viewfinder 11 of the camera 1. A field lens 13 and a penta-roof prism 15 in the viewfinder 11 direct the light rays through an eyelens 17 at the rear of the camera 1 to enable the subject to be photographed to be viewed through the taking lens 3. The prism 15 has several reflecting surfaces which turn the image formed by the taking lens 3 on the ground glass screen 9 upright as well a right-way-round. When the mirror 5 is swung from its light-reflecting position shown in FIG. 1 to its vertical position shown in FIG. 3, the light rays from the taking lens 3 fall on the film frame F. The positioning of the mirror 5 is such that when an image of the subject to be photographed is focused on the ground glass screen 9, with the mirror at the 45° angle, the same image falls into focus on the film frame F when the mirror is swung out of the way.

If a conventional focal plane shutter, not shown, is employed in the camera 1, the protection of the film frame F against ambient light during viewing and focusing raises no special problems: the shutter blades cover the film frame at all times except during the actual exposure. As the mirror 5 is swung out of the way from its light-reflecting position shown in FIG. 1 to its vertical (or non-reflecting) position shown in FIG. 2, the light rays fall only on the blind of the focal plane shutter, but as the mirror reaches the upper limit of its travel, it presses against a stop 19 which by known means, not shown, releases the shutter blades to make the exposure.

When the focal plane shutter is opened, with the mirror 5 in its non-reflecting position, separate means must be provided for covering the underside of the ground glass screen 9 to prevent ambient light entering the prism 15 thorugh the eyelens 17 from reaching the film frame F and to prevent the rays of light coming through the taking lens 3 from reflecting off the ground glass screen on to the film frame. Typical means for this purpose are a roller blind shutter or a special capping plate which is actuated to obscure the underside of the ground glass screen 9.

If a conventional diaphragm shutter, not shown, is employed in the camera 1, rather than a focal plane shutter, the design requirements become more complex, since the shutter must be open for viewing and focusing, but still let no light through to the film frame F. This is achieved by a more involved shutter cycle and by the provision of a special capping plate which normally closes the film aperture, not shown, in the back of the camera 1 to cover the film frame F. The shutter cycle provides a possibility of continuous opening (for viewing and focusing) and normal opening and closing to control the exposure. During viewing, the shutter is open (and the lens diaphragm fully open as well), but the capping plate is closed to cover the film frame F. On pressing the release button to make the exposure, the shutter closes, the lens diaphragm closes down to a preselected aperture, the mirror and capping plate swing out of the way, and the shutter opens and closes again for the actual exposure. The capping plate may be used to obscure the underside of the ground glass screen 9 when it is swung out of the way.

According to the preferred embodiment of the invention, the mirror 5 is supported for its swinging movement by a pair of swing arms 21, only one of which is shown, pivotally connected by a common pivot shaft 23 to respective opposite longitudinal edges 25 of the mirror, at separate locations adjacent one end 27 of the mirror. The swing arms 21 are pivotally mounted to the body of the camera 1 by a common pivot shaft 29. The mirror 5 includes respective guide or follower members 33 projecting from the two longitudinal edges 25 of the mirror, at separate locations adjacent another end 35 of the mirror. The guide members 33 are each disposed within an arcuate guide slot 37 defined by a frame member 39, arranged within a space 41 between the prism 15 and the eyelens 17.

OPERATION (FIGS. 1 AND 3)

When the release button is pressed to make the exposure, a pivotally mounted latch 43 is swung by known means, not shown, in a counterclockwise direction in FIG. 1 to disengage from a stud-like projection 45 on one of the swing arms 21. This allows a spring 47 to pivot the swing arms 21 in a counterclockwise direction in FIG. 1. As a result, the mirror 5 is similarly swung in an arc 49 subtended by an angle of approximately 45°, from its light-reflecting position in FIG. 1 to its vertical position in FIG. 3. Specifically, the mirror 5 is swung about a single axis defined by the pivot shaft 29, and comes to rest vertically erect between the prism 15 and the eyelens 17.

Figure 3:
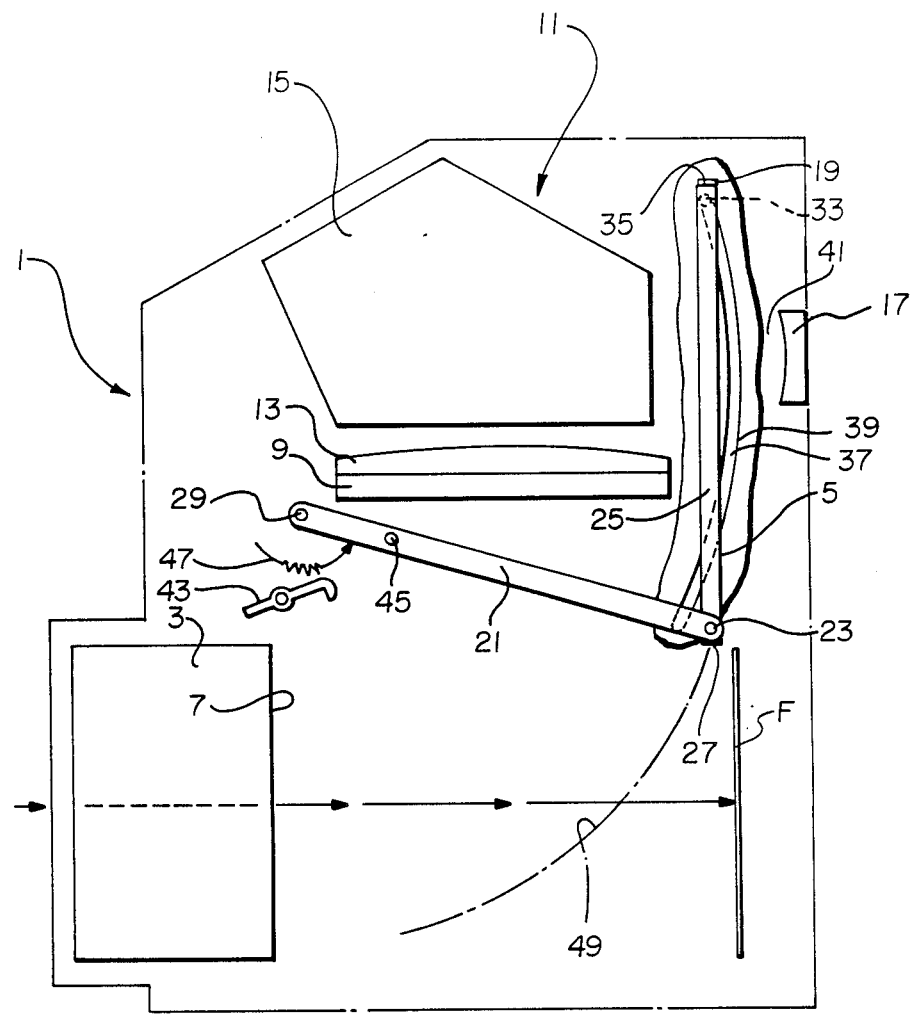

To return the mirror 5 to its light-reflecting position in FIG. 1, from its vertical position in FIG. 3, there is provided known means, such as a drive motor and a cam assembly, not shown, which are automatically actuated after the exposure is made. The cam assembly is driven by the motor to rotate the mirror 5 in a clockwise direction in FIG. 3 back to its light-reflecting position.

It will be appreciated that when the mirror 5 is swung from its light-reflecting position in FIG. 1 to its vertical position in FIG. 3, and vice-versa, it is swung in a way that reduces the clearance required for such movement as compared to prior art devices. This advantageously permits the back focus of the taking lens 3 required to clear the mirror 5 for its movement to be reduced, making it possible to reduce the front-to-back dimension of the camera 1.

The invention has been described in detail with particular reference to a preferred embodiment, but it will be understood that variations and modifications can be effected within the spirit and scope of the invention.

I claim:

1. An improved single lens reflex camera of the type wherein a mirror can be positioned at an angle between a focusable taking lens and the film to reflect the rays of light that come through said lens, on to a spaced prism and eyelens of a viewfinder, and can be positioned out of the way to expose the film, and wherein the improvement comprises:

means for supporting said mirror to swing from its light-reflecting position at said angle between the taking lens and the film to a non-reflecting position substantially vertically erect between said prism and said eyelens, whereby the back focus of the taking lens required to clear the mirror for movement from its light-reflecting position to out of the way to expose the film can be reduced.

2. The improvement as recited in claim 1, wherein said supporting means supports said mirror to swing from its light-reflecting position to its non-reflecting positoin in an arc subtended by an angle of approximately 45°.

3. The improvement as recited in claim 1, wherein said supporting means includes a swing arm mounted for pivotal movement and pivotally connected to said mirror, a projecting member secured to the mirror, and means defining an arcuate guide slot for receiving said projecting member to direct said mirror from its light-reflecting position to its non-reflecting position in response to pivotal movement of said swing arm in a predetermined direction.

* * * * *